United States Patent
Kilos et al.

(10) Patent No.: US 9,890,047 B2
(45) Date of Patent: Feb. 13, 2018

(54) HIGH POROSITY MESOPOROUS SILICEOUS STRUCTURES

(71) Applicant: Dow Global Technologies LLC, Midland, MI (US)

(72) Inventors: Beata A Kilos, Midland, MI (US); Cathy L Tway, Midland, MI (US); Scott T Matteucci, Midland, MI (US); Christopher J Tucker, Midland, MI (US); Anne M Kelly-Rowley, Midland, MI (US)

(73) Assignee: Dow Global Technologies LLC, Midland, MI (US)

(*) Notice: Subject to any disclaimer, the term of this patent is extended or adjusted under 35 U.S.C. 154(b) by 939 days.

(21) Appl. No.: 14/352,423

(22) PCT Filed: Nov. 19, 2012

(86) PCT No.: PCT/US2012/065809
§ 371 (c)(1),
(2) Date: Apr. 17, 2014

(87) PCT Pub. No.: WO2013/078120
PCT Pub. Date: May 30, 2013

(65) Prior Publication Data
US 2014/0295165 A1    Oct. 2, 2014

Related U.S. Application Data (60) Provisional application No. 61/563,189, filed on Nov. 23, 2011.

(51) Int. Cl.
*C01B 33/12* (2006.01)
*C01B 37/02* (2006.01)

(52) U.S. Cl.
CPC ............ *C01B 33/128* (2013.01); *C01B 33/12* (2013.01); *C01B 37/02* (2013.01); *Y10T 428/249921* (2015.04)

(58) Field of Classification Search
CPC ....... C01B 33/12; C01B 33/128; C01B 33/00; C01B 37/02
See application file for complete search history.

(56) References Cited

U.S. PATENT DOCUMENTS 5,098,684 A    3/1992    Kresge et al.
5,266,541 A    11/1993    Kresge et al.
(Continued)

FOREIGN PATENT DOCUMENTS

JP    H09-067115 A    3/1997
JP    2001261326 A    9/2001
(Continued)

OTHER PUBLICATIONS

The United States Patent and Trademark Office Action dated Feb. 1, 2016 for U.S. Appl. No. 14/352,705.
(Continued)

*Primary Examiner* — Melvin C Mayes
*Assistant Examiner* — Smita Patel
(74) *Attorney, Agent, or Firm* — The Dobrusin Law Firm, P.C.; Norman L. Sims (57) ABSTRACT

A process comprising: A) contacting one or more of sources of silicon oxide, selected from water soluble.silica sources arid alkali metal silicates, with an aqueous reaction medium, comprising one or more nonionic surfactants and thereby forming mesoporous structures comprising crosslinked silicon oxide units, wherein said crosslinked silicon oxide units have pores of about 1 to about 100 nanometers and wherein the aqueous reaction medium exhibits a pH of about 0 to about 4.0; B) exposing the aqueous reaction medium con-
(Continued)

taining the mesoporous structures to elevated temperatures for a time sufficient to achieve the desired structure and pore size. Preferred water soluble silica sources comprise silicic acid, or polysilicic acids, The aqueous reaction, medium is prepared by combining one or more nonionic surfactants and water, theteby forming an aqueous, reaction medium, comprising micelles. Preferably, the aqueous reaction medium further comprises, a. micelle swelling agent capable of swelling micelles formed by the surfactant in the aqueous reaction medium. In one embodiment the process forms structures with struts comprised of crosslinked silicon oxides which connect at least some of the pore forming structures.

7 Claims, 1 Drawing Sheet

(56) References Cited

U.S. PATENT DOCUMENTS

| | | | |
|---|---|---|---|
| 5,304,363 | A | 4/1994 | Beck et al. |
| 5,800,799 | A | 9/1998 | Pinnavaia et al. |
| 5,844,115 | A | 12/1998 | Moody et al. |
| 5,922,299 | A | 7/1999 | Bruinsma et al. |
| 6,506,485 | B1 | 1/2003 | Pinnavaia et al. |
| 6,641,657 | B2 | 11/2003 | Pinnavaia et al. |
| 2003/0031615 | A1 | 2/2003 | Satou et al. |
| 2004/0122250 | A1 | 6/2004 | Corriu et al. |
| 2006/0118493 | A9 | 6/2006 | Chmelka et al. |
| 2009/0047329 | A1 | 2/2009 | Stucky et al. |

FOREIGN PATENT DOCUMENTS

| | | |
|---|---|---|
| JP | 2002167213 A | 6/2002 |
| JP | 2004536043 A | 12/2004 |
| JP | 2009029684 A | 2/2009 |
| JP | 2010228986 A | 10/2010 |
| WO | 9824724 A1 | 6/1998 |
| WO | 2006136339 A1 | 12/2006 |
| WO | 2007129849 A1 | 11/2007 |
| WO | 2008/088647 A1 | 7/2008 |

OTHER PUBLICATIONS

Third Office Action from the Patent Office of the People's Republic of China for Application No. 201280057921.0, dated Jun. 21, 2016.
Japanese Patent Office First Office Action for Application No. 2014-543516, dated Oct. 4, 2016.
The Patent Office of the People's Republic of China. First Office Action dated May 6, 2015 for Application No. 201280057921.0.
JACS Communications *Low-Temperature Strategy to Synthesize Highly Ordered Mesoporous Silicas with Very Large Pores*;; Jie Fan; Jul. 15, 2005.
*Highly Uniform Nano and Mesostructures of Silica Obtained by Reverse Micellar and Hydrothermal Methods*; Ashok Ganguli; Received Jan. 12, 2009/Published online: Apr. 14, 2009; pp. 417-427.
Chemcomm Communication *A low cost route to hexagonal mesostructured carbon molecular sieves*; Seong-Su Kim and Thomas J. Pinnavaia; Chem.Commun, 2001, 2418-2419.
*Hexagonal to Mesocellular Foam Phase Transition in Polymer-Templated Mesoporous Silicas*; John S. Lettow et al. *Langmuir* 2000, 16, 8291-8295; Published on Web Sep. 30, 2000.
*Microemulsion Templating of Siliceous Mesostructured Cellular Foams with Well-Defined Ultralarge Mesopores*; Patrick Schmidt-Winkel; *Chem. Mater.* 2000, 12, 686-696.
*Microemulsion Templates for Mesoporous Silica*; Patrick Schmidt-Winkel; *Langmuir*, vol. 16, No. 2, 2000, 356-361.
*Sol-Gel-Glass; 1. Gelation and Gel Structure*; C.J. Brinker; Journal of non-crystalline solids 70 (1985) 301-322.
F. Cot; *Improved Synthesis of MSU-X Silica Prepared by Polyethulene Oxide Surfacrants*; Mesoporous Molecular Sirves 1998; studies in surface science and catalysis, vol. 117.
Abhijeet Karkamkar; *Hydrothermal Restructuring of the Cell and Window Sizes of Silica Foams*, Chem. Mater. 2003, 15, 11-13; 2003 American Chemical Society Published on Web Dec. 11, 2002.
Ce'dric Lesaint; *Fluorescence Probing Investigation of the Mechanism of Formation of MSU-type Mesoporous Silica Prepared in Fluoride Medium; Langmuir* 2005, 21, 8923-8929.
John Stangland; *The synthesis, Characterization, and Catalytic Application of Mesocellular Silica Foams*; http://libraries.mit.edu/docs; pp. 1-136 May 2002.
Patrick Schmidt-Winkel *Mesocellular Siliceous Foams with Uniformly Sized Cells and Windows; J. Am. Chem. Soc.* 1999, 121, 254-255.
Seong Su Kim; *Ultrastable Mesostructured Silica Vesicles; Science* 282, 1302 (1998); DOI 10.1126/science.282.5392.1302.
Chengzhong Yu; *Synthesis of Mesoporous Silica from Commercial Poly(ethylene oxide)/Poly(butylene oxide) Copolymers: Toward the Rational Design of Ordered Mesoporous Materials; J. Phys. Chem.* B 2003, 107, 13368-13375.
Search Report and Written Opinion dated Mar. 26, 2013 for International Application PCT/US2012/065809.
The Patent Office of the People's Republic of China Office Action dated Dec. 30, 2015 for Application No. 201280057921.0.

HIGH POROSITY MESOPOROUS SILICEOUS STRUCTURES

FIELD OF THE INVENTION

The invention relates to amorphous mesoporous siliceous structures based on crosslinked silicon oxide units and to processes for preparing such structures.

BACKGROUND OF THE INVENTION

Mesoporous structures refer to high-surface area porous oxides, such as silicon oxides, having an average pore size of not greater than about 100 nanometers as calculated using the nitrogen adsorption/desorption isotherm, as disclosed in Stucky et al., US Patent Publication 2009/0047329 incorporated herein by reference in its entirety. Some mesoporous oxide structures can be prepared in the form of mesocellular foams. Mesoporous silicon oxide based structures are believed to be useful in a variety of applications, such as thermal insulation, treatment of bleeding wounds, catalysis, molecular separations, fuel cells, adsorbents, patterned-device development, optoelectronic devices and in biological sensors, among others. These mesoporous structures provide relatively low cost, ease of handling and high resistance to photo-induced corrosion.

Mesoporous structures are generally prepared by exposing a source of a metal or metalloid oxide, e.g. silicon oxide, for instance tetraethylorthosilicate, to cross-linking conditions with a micro-emulsion or emulsion of surfactants, and optionally micelle swelling agents, in water. The metal or metalloid oxide, silicon oxide, crosslinks to form on the surface of the micelles of the surfactant, and optionally micelle swelling agent, to form the basic mesoporous structure. The size of the pores is related to the size of the micelles formed. The size of the micelles can be adjusted by swelling with one or more micelle swelling organic solvents. The reaction medium containing the mesoporous structures is exposed to elevated temperatures so as to further adjust the pore structure and properties. The mesoporous structures are separated from the aqueous reaction medium and exposed to temperatures at which any organic materials are removed by volatilization and/or burning them out. The structure of the mesoporous materials may be altered by heating to temperatures at which they undergo calcination, up to 500° C.

Early mesoporous structures were reported to be crystalline as evidenced by the presence of patterns in XRD profiles ($2\theta=0\text{-}10$) obtained by X-ray powder diffraction and exhibit mesopores of the size of about 1.0 to about 100 nanometers. See Kresge et al. U.S. Pat. No. 5,098,684; Beck et al. U.S. Pat. No. 5,304,363 U.S. Pat. No. 5,304,363; and Kresge et al. U.S. Pat. No. 5,266,541, incorporated herein by reference in their entirety. Such mesoporous silicon oxide based structures are disclosed as being crystalline in nature, brittle and having thin pore walls. Pinnavia et al. U.S. Pat. No. 6,641,657: and U.S. Pat. No. 6,506,485, incorporated herein by reference in their entirety, address this issue by preparing amorphous highly crosslinked silicon oxide mesoporous structures. Such mesoporous structures are disclosed to have a connectivity $Q^4/(Q^3+Q^2)$ ratio of 2.5 to 8.0, wherein $Q^4$ is the number of silicon oxide units having four bonds to other silicon oxide units, $Q^3$ is number of silicon oxide units having three bonds to other silicon oxide units and $Q^2$ is number of silicon oxide units having two bonds to other silicon oxide units. Such mesoporous structures can be relatively dense, exhibit relatively low pore volumes and have few silanol groups. For certain uses, such as in insulation foams, high pore volume materials are desired. In other uses high silanol concentrations are desirable, for instance where it is desirable to bond functional compounds into the mesoporous structures. See also Chmelka et al., US 2006/0118493; and Stucky US 2009/0047329 incorporated herein by reference in their entirety.

Processes for preparing known mesoporous silicon oxide based structures present challenges. Chmelka et al. and Stucky et al. disclose the use of tetraalkyl orthosilicates, such as tetraethyl orthosilicate, as a source of silicon oxide. Tetraalkyl orthosilicates are relatively costly, which limit some of the applications of mesoporous structures prepared therefrom. In addition, the use of tetraalkyl orthosilicates results in the generation of alkanol(s) byproducts, the presence of which can affect micelle structures and introduce variability in the resulting mesoporous structure, for instance a broader pore size distribution. Pinnavaia et al. U.S. Pat. No. 6,641,657; and U.S. Pat. No. 6,506,485 disclose the use of water soluble silicates, ionic silicates, as the source of silicon oxide. The ionic silicates leave residual ions, such as alkali metal ions, in the resulting product and in the aqueous mixture left behind after recovery of the crosslinked silicon oxide highly mesoporous precursor. The presence of the ions in the ultimate mesoporous structures can present problems for certain uses. The aqueous mixtures can contain ions in the aqueous mixture left behind after recovery of the crosslinked silicon oxide mesoporous structures and may contain surfactants and organic materials after preparation of the precursors. This can present challenges with respect to disposal of the aqueous mixtures. Many disclosed processes for the preparation of mesoporous silicon oxide structures utilize calcination steps which require exposure of the precursors to high temperatures for extended time periods, which can be costly and energy intensive.

What are needed are mesoporous silicon oxide based structures which are amorphous, exhibit high pore volumes and low densities, contain relatively high levels of silanol groups along the backbone of the silicon oxide chains and contain low residual ion levels. What are needed are processes for preparing such mesoporous structures that utilize cost effective sources of silicon oxide, which do not require the presence of metal ions, do not require the use of a calcination step and which allow for the recovery and reuse of organic materials used in preparing the highly porous mesoporous siliceous structures.

SUMMARY OF THE INVENTION

The invention is a process comprising: A) contacting one or more of sources of silicon oxide, selected from water soluble silica sources and alkali metal silicates, with an aqueous reaction medium comprising one or more nonionic surfactants and thereby forming mesoporous structures comprising crosslinked silicon oxide units, wherein said crosslinked silicon oxide units define (have) pores of about 1 to about 100 nanometers and wherein the aqueous reaction medium exhibits a pH of about 0 to about 4.0; B) exposing the aqueous reaction medium containing the mesoporous structures to elevated temperatures for a time sufficient to achieve the desired structure and pore size. Preferred water soluble silica sources comprise silicic acid or polysilicic acids. The aqueous reaction medium is prepared by combining one or more nonionic surfactants and water, thereby forming an aqueous reaction medium comprising micelles. Preferably, the aqueous reaction medium further comprises a micelle swelling agent capable of swelling micelles formed by the surfactant in the aqueous reaction medium. In one embodiment the process forms structures with struts comprised of crosslinked silicon oxides which connect at least some of the pore defining structures. In a preferred embodiment the source of silicon oxide is silicic acid or polysilicic acid.

The invention further relates to a composition comprising a crosslinked network of a sufficient amount of silicon oxide units crosslinked in a sufficient amount to form one or more mesoporous structures wherein the mesoporous structures exhibit a pore volume of about 1.5 cm$^3$/g (as determined by N$_2$ adsorption/desorption measurements) or greater and are amorphous. Such compositions preferably exhibit a connectivity of the crosslinked network of 2.5 or less wherein connectivity is defined by $Q^4/(Q^2+Q^3)$ wherein $Q^4$ is the number of silicon oxide units having four bonds to other silicon oxide units, $Q^3$ is number of silicon oxide units having three bonds to other silicon oxide units and $Q^2$ is number of silicon oxide units having two bonds to other silicon oxide units. The mesoporous structures preferably contain crosslinked silicon oxide units containing silanol groups in a concentration of about 6 weight percent of OH or greater based on the weight of the mesoporous structure.

The products prepared by the process of the invention and the compositions of the invention may be used in a number of applications including those recited hereinbefore. The process of the invention utilizes cost effective sources of silicon oxide, which do not require the presence of metal ions, does not require the use of a calcination step and which allows for recovery and reuse of organic materials used in preparing the highly porous mesoporous siliceous structures. The process of the invention prepares mesoporous crosslinked silicon oxide structures which are amorphous, exhibit high pore volumes and low densities, contain a relatively high level of silanol groups along the backbone of the silicon oxide chains and contain low residual metal ion levels. Many of the mesoporous silicon oxide based structures prepared are novel and afford the users of such mesoporous silicon oxide structures significant advantages.

DETAILED DESCRIPTION

The explanations and illustrations presented herein are intended to acquaint others skilled in the art with the invention, its principles, and its practical application. The specific embodiments of the present invention as set forth are not intended as being exhaustive or limiting of the invention. The scope of the invention should be determined with reference to the appended claims, along with the full scope of equivalents to which such claims are entitled. The disclosures of all articles and references, including patent applications, are incorporated by reference for all purposes, in their entirety. Other combinations are also possible as will be gleaned from the following claims, which are also hereby incorporated by reference into this written description. This application claims priority from and incorporates by reference in its entirety U.S. Provisional Application Ser. No. 61/563,189 filed Nov. 23, 2011.

The invention relates to novel mesoporous silicon oxide based structures and novel processes for preparing such structures. The silicon oxide based structures may be SiO$_4$ (silicon tetra oxide) based. It is contemplated that the following features, and their preferred embodiments as disclosed herein, may be utilized in any combination. With respect to the claimed process the following features may be utilized in any combination: the process forms structures with or without struts comprised of crosslinked silicon oxides which connect the pore forming structures thereby forming mesoporous structures; the mesoporous structures are separated from the aqueous reaction medium; a portion of the surfactant and/or micelle swelling agent is removed from the mesoporous structures; the removal of the surfactant and/or micelle swelling agent may be accomplished by extraction with a solvent for the surfactant and/or micelle swelling agent and/or by exposing the mesoporous structures to temperatures at which the surfactant and/or micelle swelling agent can be removed from the mesoporous structures; the mesoporous structures are exposed to temperatures of greater than 160° C. to about 500° C., preferably in air, for a time sufficient to remove the surfactant and/or micelle swelling agent from the mesoporous silicon oxide structures; the surfactant is a mono-functional hydroxyl or amine terminated C$_{1-20}$ hydrocarbyl polyalkylene oxide; the weight ratio of micelle swelling agent to surfactant is about 0:2.0 to about 8.0:2.0; the micelle swelling agent exhibits a boiling point below the temperature utilized in removing surfactants and/or micelle swelling agents, Step B: the micelle swelling agent volatilizing during step B is collected and recycled for use in the aqueous reaction medium in the first step, Step A: the aqueous reaction medium is recycled for use in the second step, Step B: and any of the structural features of the novel mesoporous silicon oxide structures the invention as disclosed herein. With respect to the claimed process and compositions prepared therefrom the following features may be utilized in any combination: a composition comprising a crosslinked network of a sufficient amount of silicon oxide units crosslinked in a sufficient amount to form one or more mesoporous structures wherein the mesoporous structures exhibit a pore volume of about 1.5 cm$^3$/g (as determined by N$_2$ adsorption/desorption measurements) or greater and are amorphous; the connectivity of the crosslinked network is 2.5 or less wherein connectivity is defined by $Q^4/(Q^2+Q^3)$ wherein $Q^4$ is the number of silicon oxide units having four bonds to other silicon oxide units, $Q^3$ is number of silicon oxide units having three bonds to other silicon oxide units and $Q^2$ is number of silicon oxide units having two bonds to other silicon oxide units; the crosslinked silicon oxide units contain silanol groups in a concentration of about 6 weight percent of OH or greater; the mesoporous structures contain from about 0.01 to about 50.0 percent by weight of organic compounds; the mesoporous structures contains from about 0.005 to about 0.5 percent by weight of one or more alkali metals; the mesoporous structures comprise a plurality of structures of crosslinked silicon oxide units defining pores of about 1 to about 100 nanometers; the pore defining structures are connected to one another by crosslinked silicon oxide struts wherein window are formed by the struts and the pore defining structures and the windows have a size of about 2 nanometers to about 20 nanometers; the thickness of the walls of the pore defining structures are about 2 to about 5 nanometers; the ratio of the average pore size (cell size) to the average window size is about 0.8 to about 1.3; and the distribution of pore sizes is about 20 nm or less and the distribution of window sizes is about 20 nm or less as determined by $N_2$ adsorption/desorption measurements. Unless stated otherwise in this specification, percent by weight refers to the weight of the aqueous reaction mixture or the mesoporous structures prepared, as indicated by the context of the relevant passage.

The composition comprises cross-linked mesoporous structures containing silicon oxide units, preferably silicon tetraoxide ($SiO_4$) units. Chains of silicon oxide are prepared with crosslinks between the chains. In cross-linked structures a significant number of the silicon oxide units have three or four of the oxygen atoms further bonded to other silicon atoms. The cross-linked silicon oxide units are formed into structures comprised of walls defining pores which may exhibit any cross sectional shape useful in mesoporous structures, for example irregular, circular hexagonal, lamellar, and the like. These pore-defining structures may be interconnected by cross-linked silicon tetraoxide structures which are in the form of struts. The struts connecting the pore-defining structures create open areas between the walls of the pore-defining structures and the struts, the open areas are commonly referred to as windows. Structures containing a high percentage of these interconnected pore defining structures may be referred to as foams because they have relatively high pore volume and consequently low density. In one embodiment, the formed structures contain a plurality of the connected pore defining structures connected by a plurality of struts and demonstrate tortuous open paths through the structure. The high pore volume and the tortuous paths provide significant advantages in a variety of uses as described hereinbefore. Mesoporous structures are generally accepted to have pores having a size of about 2 nanometers or greater and a sire of about 100 nanometers or less, and preferably about 50 nanometers or less as defined by IUPAC. One measure of the level of cross-linking of a network of silicon oxide units is the number of units bonded to four adjacent silicon atoms ($Q^4$) compared to the number of units bonded to three other adjacent silicon units ($Q^3$) and two other adjacent silicon units ($Q^2$). This ratio is expressed as $Q+/(Q^3+Q^2)$. Where an oxygen atom on a silicon oxide unit is not bonded to an adjacent silicon atom it is typically bonded to a hydrogen atom which forms a silanol structure (—SiOH). The relative cross-linking density and number of silanol groups present impact how the mesoporous structures may be utilized. Preferably the mesoporous structures exhibit a crosslink ratio according to the formula $Q^4/(Q^3+Q^2)$ of about 0.5 or greater and about 1.0 or greater. Preferably the mesoporous structures exhibit a crosslink ratio according to the formula $Q^4/(Q^3+Q^2)$ of about 2.5 or less and preferably about 2.0 or less. Generally above 2.5 the mesoporous structures the pore volume is reduced and there are few silanol groups available for functionalization. Preferably the concentration of silanol groups in the cross-linked mesoporous structures is sufficient to allow the desired level of functionalization of the walls of the mesoporous structure. Preferably the concentration of OH groups from silanol groups in the mesoporous structure is about 6.0 weight percent or greater and most preferably about 8.0 weight percent or greater. Preferably the concentration of OH groups from silanol groups in the mesoporous structure is about 40 weight percent or less and most preferably about 32.0 weight percent or less. The pore volume is important for a number of uses of the mesoporous structures and is chosen to facilitate the designated use. The mesoporous structures preferably exhibit a pore volume of about 1.5 $cm^3/g$ (as determined by $N_2$ adsorption/desorption measurements) or greater, more preferably about 2.0 $cm^3/g$ or greater and most preferably about 2.5 $cm^3/g$ or greater. The mesoporous structures preferably exhibit a pore volume of about 6 $cm^3/g$ or less and most preferably about 3.1 $cm^3/g$ or less. The walls of the structures that form the pores are of a sufficient thickness such that the mesoporous structures have sufficient structural integrity. Generally the wall thickness as measured from the pore to the outside surface is about 2 nm or greater and more preferably about 3 nm or greater. Generally the wall thickness as measured from the pore to the outside surface is about 6 nm or less and more preferably about 5 nm or less. The mesoporous structures have pores within the accepted definition of mesoporous structures. In one embodiment, the mesoporous structures may be referred to as mesocellular foams having pores within the accepted definition of such foams. Preferably the pores of the mesoporous structures are about 2 nanometers or greater as defined by IUPAC, more preferably about 5 nanometers or greater and most preferably about 10 nanometers or greater. Preferably the pores of the mesoporous structures are about 100 nanometers or less as defined by IUPAC, more preferably about 50 nanometers or less and most preferably about 20 nanometers or less. The windows as described hereinbefore typically have a different size than the pores. Preferably the windows are about 1 nanometers or greater, more preferably about 4 nanometers or greater and most preferably about 10 nanometers or greater. Preferably the windows are about 100 nanometers or less, more preferably about 45 nanometers or less and most preferably about 20 nanometers or less. Pore size and window size are determined using the nitrogen adsorption/desorption method, as disclosed in Stucky et al., US 2009/0047329 incorporated herein by reference in its entirety. The ratio of the pore size to the window size impacts the properties of the mesoporous structures by moderating the rate of diffusion of components into and out of the pores and cell strength of the mesoporous structures. Preferably the ratio of the pore size to the window size is about 0.5 or greater and more preferably about 0.8 or greater. Preferably the ratio of the pore size to the window size is about 2.0 or less, more preferably about 1.5 or less and most preferably about 1.3 or less. The ratios as stated may be alternatively expressed as the number stated: 1, for example 0.5:11 to 2.0:1. In one embodiment the process facilitates the preparation of mesoporous structures with low metal, metal oxide or metal ion and or cation (such as an ammonium based cation) content. When metal, metal oxide, and/or metal ions are present it is preferred that the mesoporous structures contain about 0.5 weight percent or less of metal, metal oxide or metal ions content, preferably about 0.2 weight percent or less and most preferably about 0.05 weight percent or less. If metal, metal oxide or metal ions are present they may be present in an amount of about 0.005 percent by weight or greater and more preferably about 0.01 percent by weight or greater. Any metal that can be present in a starting material may be present. The metal may be an alkali metal, with potassium and sodium the most likely metals. In one embodiment the process facilitates the preparation of mesoporous structures that contain organic components. The process can be adjusted to remove or retain some of the residual organic components. Generally the organic components are either micelle swelling agents, or by-products formed during preparation of the mesoporous structures or surfactants that become entrained in the cross-linked structure formed. The mesoporous structures may contain any amount of organic materials that does not interfere with functioning in the desired use. Preferably the mesoporous structures contain about 50 percent by weight or less of residual organic compounds, more preferably about 30.0 percent by weight or less and more preferably about 10 percent by weight or less. If organic compounds are present they may present in an amount of about 0.01 percent by weight or greater. The mesoporous structures prepared are preferably amorphous, that is non-crystalline in nature. The mesoporous structures do not contain peaks in the 2θ=0-10° range. X-ray diffraction powder patterns of amorphous materials do not contain peaks in the 2θ=0-10°. The mesoporous structures exhibit the unique property that they are opaque when contacted with carbon tetrachloride. The process starts with one or more silicon oxides which can be converted under the reaction conditions to cross-linked silicon oxides, such as silicon tetraoxide. Any silicon oxide which can be converted to cross-linked silicon oxides may be used as starting materials for this process. Materials containing silicon dioxide units are good starting materials. Exemplary starting materials include one or more of water soluble silicates, silicic acid or polysilicic acids. Exemplary water soluble silicates include sodium silicates, potassium silicates and alkyl ammonium silicates, with sodium silicates preferred. Preferred silicon oxides include silicic acid and polysilicic acids, with polysilicic acids more preferred. Preferred polysilicic acids correspond to the formula $(SiO_x(OH)_{4-2x})_n$ wherein x is separately in each occurrence one or two and n is selected such that the polysilicic acids are water soluble, and preferably separately in each occurrence is a real number of about 1 or greater and more preferably about 4 or greater. Preferably n is a real number of about 100 or less and more preferably about 50 or less. In some processes the silicon oxide source contains alkoxy groups which hydrolyze during the process and form alkanols which become entrained in the reaction medium. Preferably the source of silicon oxide does not generate alkanols, such as ethanol, in the process of forming the products of the invention. In essence it is preferred that the process used to prepare the mesoporous structures of the instant invention does not generate organic by-products and is organic by-product, e.g. alkanol, free.

In the embodiment wherein the starting material is silicic acid or one or more polysilicic acids, the silicic acid or one or more polysilicic acids may be prepared by replacing the ionic groups on one or more metal silicates, such as sodium silicates, with hydrogen atoms. Any known process that can perform the cation replacement may be utilized. A preferred process for replacing the ionic groups with hydrogen ions involves passing the water soluble silicate through a cationic exchange resin in the hydrogen form that replaces the cations with hydrogen ions. In general the water soluble silicate is dissolved in water and passed through a bed of the ion exchange resin. Any ion exchange resin that can exchange the cations with hydrogen ions may be utilized. Among preferred ion exchange resins are AMBERLITE IR 120 hydrogen form ion exchange resin and Amberlyst 35 ion exchange resin and the like. The water soluble silicate can be passed through the ion exchange resin column or contacted with ion exchange resin under any conditions which facilitate the replacement of the cations with hydrogen ions.

The source of silicon oxide is contacted with a reaction medium of water containing a surfactant. The aqueous reaction medium is prepared by contacting water with a nonionic surfactant and sufficient amount of acid to adjust the pH to the acidic range. The pH is chosen so that the process of cross-linking the silicon oxide units proceeds at a reasonable rate. Preferably the pH of the aqueous reaction medium is 0 or greater, more preferably about 0.5 or greater, and most preferably about 1.0 or greater. Preferably the pH of the aqueous reaction medium is about 5.0 or less and more preferably about 4.0 or less and most preferably about 3.0 or less. The pH may be adjusted by the addition of a strong acid. Exemplary strong acids include mineral acids, such as sulfuric acid, nitric acid, and hydrochloric acid, and strong carboxylic acids, such as acetic acid, trifluoroacetic acid, glycolic acid, formic acid and citric acid. A sufficient amount of acid is added to the water reaction medium to achieve the desired pH. One skilled in the art can determine the appropriate amount of acid to add to the aqueous reaction medium to achieve the desired pH. In addition one or more surfactants, and optionally one or more micelle swelling agents, are added to the aqueous reaction medium. As a result an oil-in-water emulsion or microemulsion is formed. The one or more silicon oxide precursors are added to the formed aqueous reaction medium. The concentration of silicon oxide containing compounds in the aqueous reaction medium is selected to facilitate forming of cross-linked silicon oxides. Preferably the concentration of the silicon oxide containing compounds in the aqueous reaction medium is about 0.5 percent by weight or greater, more preferably about 1.0 percent by weight or greater and most preferably about 2.0 percent by weight or greater. Preferably the concentration of the silicon oxide containing compounds in the aqueous reaction medium is about 10 percent by weight or less, more preferably about 8.0 percent by weight or less and most preferably about 5.0 percent by weight or less. The silicon oxide containing compounds are contacted with the aqueous reaction medium, oil in water microemulsion or emulsion, wherein micelles are formed by the surfactant and the optional micelle swelling agent. The aqueous reaction medium is subjected to one or more forms of agitation and/or shear to form an emulsion or microemulsion. Agitation and shear can be introduced through the use of impellers, ultrasonication, rotor-stator mixers and the like. For the industrial-scale production of emulsions or suspensions it is possible to pass the aqueous reaction medium a number of times through a shear field located outside a reservoir/polymerization vessel until the desired micelle is achieved. Exemplary apparatuses for generating a shear field are comminution machines which operate according to the rotor-stator principle, e.g. toothed ring dispersion machines, colloid mills and corundum disk mills and also high-pressure and ultrasound homogenizers. To regulate the micelle size, it can be advantageous to additionally install pumps and/or flow restrictors in the circuit around which the emulsion or suspension circulates. The contacted ingredients are subjected to one or more forms of agitation and/or shear to form the desired emulsion or suspension. The micelle size is selected to provide the desired pore size. The micelles form a template for the pores in the pore defining structure.

The aqueous reaction medium contains one or more surfactants which under reaction conditions, in particular agitation, form micelles which function as templates for the formation of the pore containing structures. The surfactants are preferably nonionic in nature. Preferred surfactants contain as the hydrophilic portion one or more ethylene oxide chains and one or more hydrophobic chains. Such hydrophobic chains can be hydrocarbon chains, hydrophobic alkylene oxide chains, or a combination thereof. Exemplary hydrophobic alkylene oxide chains include propylene oxide chains and butylene oxide chains. Among exemplary surfactants containing ethylene oxide hydrophilic chains are hydrocarbyl polyethylene oxides, block copolymers of ethylene oxide and hydrophobic alkylene oxides (such as propylene oxide and butylene oxide) and amine initiated block copolymers of ethylene oxide and one or more hydrophobic alkylene oxides. Pinnavaia U.S. Pat. No. 6,506,485, incorporated herein by reference, discloses exemplary hydrocarbyl polyethylene oxides are alkyl polyethylene oxides and alkyl phenyl polyethylene oxides including those disclosed in at column 4 lines 14 to 33, exemplary block copolymers of ethylene oxide and hydrophobic alkylene oxides at column 4 lines 34 to 43, and exemplary amine initiated block copolymers of ethylene oxide and one or more hydrophobic alkylene oxides at column 4 lines 44 to 50. Surfactants referred to as amphiphilic surfactants are disclosed in Chemelka et al. US 20060118493 page 6 paragraphs 0083 to 0090, incorporated herein by reference. Preferably the surfactant is an amphiphilic block copolymer, amino-functional hydroxyl or amine terminated $C_{1-20}$ hydrocarbyl polyalkylene oxide. Preferred surfactants include mono-functional hydroxyl or amine terminated $C_{1-20}$ hydrocarbyl polyalkylene oxides. Preferably the mono-functional hydroxyl or amine terminated $C_{1-20}$ hydrocarbyl polyalkylene oxides correspond to the following formula $R^1$—X—$(CH(R^2)CH(R^2)O)_p (CH_2CH_2O)_qH$ wherein $R^1$ is separately in each occurrence a $C_{1-20}$ hydrocarbyl group; X is separately in each occurrence O or $N(R^3)$; $R^2$ and $R^3$ are separately in each occurrence hydrogen or lower alkyl; and p is a number of 0 or greater; q is a number of 1 or greater; wherein p and q are selected such that the compound formed functions as a surfactant and the micelles formed from the surfactant are of the desired size to form pores of the desired size. $R^1$ is preferably $C_{1-20}$ alkyl, aryl, alkaryl or aralkyl. In one embodiment $R^1$ is phenyl or alkyl phenyl. $R^1$ is preferably hydrogen or methyl. Preferably, in each unit only one $R^2$ is a lower alkyl group and the other is hydrogen. $R^3$ is preferably hydrogen or $C_{1-4}$ lower alkyl and most preferably hydrogen. X is preferably O. Preferably p is a number of about 0 or greater and more preferably about 1 or greater, and most preferably about 2 or greater. Preferably p is a number of about 5 or less and most preferably about 3 or less. Preferably q is a number of about 2 or greater, more preferably about 4 or greater, even more preferably about 5 or greater and most preferably about 6 or greater. Preferably q is a number of about 15 or less, more preferably about 9 or less and most preferably about 8 or less. Such surfactants are preferably prepared by reacting an initiator, such as a compound having one or more amine or alcohol groups, with one or more alkylene oxides. More preferred initiators are alcohols. The alcohols may be a mixture derived from a natural source, such as a seed oil. The amines or alcohols are alkoxylated by replacing the hydroxyl group or amino group with one or more chains of one or more alkylene oxide groups. Any known alkylene oxides may be reacted with the alcohol to form the alkylene oxide chain. Among preferred alkylene oxides are ethylene oxide, propylene oxide, butylene oxide and the like. More preferred are ethylene oxide and propylene oxide. The alkylene oxide chains may comprise one, or more than one, alkylene oxide. Preferably the alkylene oxide chains comprise an ethylene oxide chain and a propylene or butylene oxide chain. Where two or more alkylene oxides are used they are preferably arranged in blocks. More preferred alkylene oxide chains include propylene oxide and ethylene oxide. Even more preferably, the chain comprises a propylene oxide block bonded to the residue of the alcohol or amine and an ethylene oxide block bonded to the propylene oxide block. The preparation of alkoxylated alcohols is described in U.S. Pat. No. 5,844,115; and WO 2008/088647 (U.S. Ser. No. 12/521,827) incorporated herein by reference in their entirety. In one embodiment the surfactant is a seed oil based surfactant. Seed oil based surfactants use seed oils as the initiators for preparing polyalkylene oxides. Generally these initiators comprise a mixture of compounds capable or initiating the formation of polyalkylene oxide chains. Preferred alkoxylated alcohols are alkoxylated seed oil alcohols including those described in WO 2008/088647 (U.S. Ser. No. 12/521,827). Preferred alkoxylated alcohols are described by the formula $R^7$—O—$(CH(R^2)CH(R^2)O)_a$—$(CH_2CH_2O)_bH_c$;

wherein:

$R^2$ is as described hereinbefore. $R^7$ is separately in each occurrence a $C_{1-20}$ straight or branched chain alkyl or alkenyl group or alkyl substituted aryl group; a is separately in each occurrence is a number of about 0 to about 6, and more preferably about 0 to about 3; b is separately in each occurrence a number of about 2 to about 10; and, c is separately in each occurrence a number of about 1 to about 6, more preferably about 1 to about 3 and most preferably 1. In one embodiment, $R^7$ is a mixture of seed-oil based linear alkyl moieties with an alkyl moiety distribution as follows wherein each weight percent is based upon weight of all alkyl moieties present in the distribution and all weight percent for each distribution total 100 weight percent: Carbon Atoms in Moiety Amount; $C_6$ 0 wt %-40 wt % $C_8$ 20 wt %-40 wt %; $C_{10}$ 20 wt %-45 wt %; $C_{12}$ 10 wt %-45 wt %; $C_{14}$ 0 wt %-40 wt %; and $C_{16}$-$C_{18}$ 0 wt %-15 wt %. Among preferred surfactants are TERGITOL™ 15S-y, where y is a numerical value associated with a surfactant, available from The Dow Chemical Company Inc., Midland, Mich.; and ECOSURF™ SA-4, SA-7, SA-9 and SA-15 seed oil based surfactants available from The Dow Chemical Company Inc., Midland Mich. and the like. The surfactants are of a suitable structure and molecular weight to form micelles of the desired size to form pores of the desired size. The particular structure impacts the molecular weight desired to prepare micelles of the desired size. Preferably the molecular weight of the surfactant is about 130 or greater and most preferably 215 or greater. Preferably the molecular weight of the surfactant is about 3,000 or less and most preferably 2,000 or less. The number of ethylene oxide units in the surfactant is preferably about 1 or greater, more preferably 2 or greater and most preferably about 3 or greater. The number of ethylene oxide units in the surfactant is preferably about 60 or less, more preferably 40 or less and most preferably about 20 or less. The amount of surfactant utilized is selected to facilitate the efficient formation of the desired mesoporous silicon oxide porous structures of the invention. The amount is preferably determined as a ratio of silicon oxide starting compounds to surfactant. Preferably the weight ratio of silicon oxide compounds to surfactant utilized is about 1:6 or greater, more preferably about 1:2 or greater and more preferably about 3:4 or greater. Preferably the weight ratio of silicon oxide compounds to surfactant utilized is about 2:1 or less, more preferably about 3:2 or less and more preferably about 1:1 or less. Within these parameters the concentration of surfactant in the aqueous reaction medium is preferably about 1 percent by weight or greater, more preferably about 1.5 percent by weight or greater and most preferably 2 percent by weight or greater. Within these parameters the concentration of surfactant in the aqueous reaction medium is preferably about 5 percent by weight or less, more preferably about 4.5 percent by weight or less and most preferably 4 percent by weight or less.

The aqueous reaction medium may optionally contain a micelle swelling agent. "Micelle swelling" agents useful in this process are organic solvents that partition to the micelles formed by the surfactant and which swell the micelles. The micelle swelling agents are present to adjust the size of the micelles by swelling the micelles so as to provide a template of a desired size for preparing pore forming structures of the desired size. Among preferred classes of solvents are aromatic hydrocarbons, aliphatic hydrocarbons, long chain esters, long chain alcohols, long chain ketones, which may be branched or unbranched, and the like. Preferred micelle swelling agents are alkyl substituted aromatic compounds. Preferable micelle swelling solvents include toluene, xylene, trimethyl benzene, ethyl benzene, diethyl benzene, cumene or a mixture thereof, with 1,3,5-trimethyl benzene most preferred The micelle swelling agent can be a mixture of micelle swelling agents. The amount of micelle swelling agent present is chosen such that the size of the micelles is of the desired size to prepare pores of the desired size. Preferably the ratio of micelle swelling agent to surfactant is about 0:2 or greater, more preferably 1:4 or greater, even more preferably about 1:1 or greater and most preferably about 2:1 or greater. Preferably the ratio of micelle swelling agent to surfactant is about 8:1 or less, more preferably about 6:1 or less and even more preferably about 4:1 or less and most preferably 3:1 or less. Within these parameters the concentration of micelle swelling agent in aqueous reaction medium is preferably about 1 percent by weight or greater, more preferably about 2 percent by weight or greater and most preferably 2.5 percent by weight or greater. Within these parameters the concentration of micelle swelling agent in aqueous reaction medium is preferably about 6 percent by weight or less, more preferably about 5 percent by weight or less and most preferably 4 percent by weight or less.

After contacting the silicon oxide containing compound with the aqueous reaction medium, the aqueous reaction medium is exposed to conditions such that crosslinked silicon oxides are formed on the surface of the micelles and optionally struts are formed between the crosslinked silicon oxide structures formed on the micelles. The aqueous reaction medium is exposed to temperatures at which formation of crosslinked silicon oxides occurs on the surface of the micelles and optionally struts are formed of crosslinked oxide between the structures formed on the micelles. Preferably the temperature is about 20° C. or greater, more preferably about 30° C. or greater and most preferably about 40° C. or greater. Preferably the temperature is about 60° C. or less, more preferably about 50° C. or less and most preferably about 45° C. or less. The aqueous reaction medium is exposed to such temperatures for a sufficient time to form the desired structures. Preferably the aqueous reaction medium is exposed to temperatures at which the desired structures are formed for about 2 hours or greater, more preferably about 12 hours or greater and most preferably 16 hours of greater. Preferably the aqueous reaction medium is exposed to temperatures at which the desired structures are formed for about 120 hours or less, more preferably about 100 hours or less and most preferably 80 hours of less. The process can be performed under ambient conditions, such as atmospheric pressure and in the presence of air. Other pressures or environments may also be utilized.

Thereafter the aqueous reaction medium is exposed to further elevated temperatures to further adjust the pore structure and properties of the crosslinked silicon oxide based pore forming structures and optionally struts. This step may tailor one or more of the following features; pore size, pore volume, density and overall porosity. Preferably the temperature is selected so as to further adjust the pore structure and properties; preferably to tailor one or more of the following features; pore size, pore volume, density and overall porosity. Preferably the temperature is about 60° C. or greater, more preferably about 70° C. or greater and most preferably about 80° C. or greater. Preferably the temperature is about 180° C. or less, more preferably about 150° C. or less and most preferably about 120° C. or less. The aqueous reaction medium is exposed to such temperatures for a sufficient time to tailor one or more of the following features; pore size, pore volume, density and overall porosity. Preferably the time for exposure to such temperatures is selected so as to further adjust the pore structure and properties: preferably to tailor one or more of the following features; pore size, pore volume, pore density and overall porosity. Preferably such time is about 1 hours or greater, more preferably about 6 hours or greater and most preferably 12 hours of greater Preferably such time is about 80 hours or less, more preferably about 60 hours or less and most preferably 50 hours of less. After this step the structure formed comprises a plurality of pore defining structures having the desired pore structure and properties, which may optionally be interconnected by a plurality of struts. The resulting product formed can be a mixture of mesoporous structures with amorphous polymeric silicon oxide based structures, which are not in the form of mesoporous structures and/or agglomerates of the pore forming structures which are not completely mesoporous structures. Preferably the mixture contains about 40 percent by volume or greater of mesoporous structures, more preferably about 50 percent by volume or greater and most preferably about 62 percent by volume or greater. Preferably the product is a solid and can be separated from the aqueous reaction mixture by any known method for separating solids from liquid media, for example filtration, centrifugation, cyclonic separation, decantation or the like. In the steps wherein the structures formed are exposed to elevated temperatures variations in time and temperature can alter the pore volume, porosity, density and pore size. Increases in time and/or temperature generally result in increases in one or more of pore volume, porosity, density and pore size.

The mesoporous structures, may be used "as is" after this process. Alternatively a portion or all of any residual micelle swelling agent, organic by-products or surfactant present in the mesoporous structures, generally referred to hereinafter as organic compounds may be removed. Any process that removes the desired portion of the organic compounds which does not negatively impact the structure or function of the mesoporous structures may be used. In one preferred embodiment the organic compounds may be removed by contacting the mesoporous structures with a washing solvent for one or more of the organic compounds. Any solvent that removes the desired amount of the organic compounds may be utilized. Preferred washing solvents are polar organic solvents or water. Preferred polar organic solvents are alcohols, ketones and acetates. More preferred polar organic solvents are alcohols and ketones with ethanol and acetone preferred. The mesoporous structures are either soaked in the solvents or the solvents are passed through a bed of the mesoporous structures. The mesoporous structures are contacted with the solvent for sufficient time to remove the desired portion of the organic compounds. In the embodiment where the polar solvent or water are passed through a bed of the mesoporous structures, polar solvents or water may be passed through the bed of the mesoporous structures a number of times. The number of times that the polar organic solvents or water is passed through the mesoporous structures is chosen to result in the desired level of organic compounds in the mesoporous structures. Polar organic solvents or water may be passed through the mesoporous structures one or more times, preferably 2 or more times and most preferably 3 or more times. The maximum number is based on the desired final level of organic compounds desired in the mesoporous structures. Generally 5 or less times are suitable. The conditions for the contacting can be any which facilitate removal of the organic compounds from the mesoporous structures. Ambient temperatures, pressures and environments may be used, although others are possible.

In another embodiment, the organic compounds may be removed from the mesoporous structures formed, by volatilizing them away or burning them out. This is achieved by exposing the mesoporous structures prepared to conditions such that the organic compounds contained in the mesoporous structures undergo volatilization or degradation and are removed from the mesoporous structures. The mesoporous structures are exposed to temperatures at which the organic compounds undergo volatilization or degradation, preferably greater than 160° C. and most preferably about 300° C. or greater. Preferably the temperatures are 500° C. or less, more preferably about 400° C. or less, and most preferably about 300° C. or less. It is preferable to flow a fluid through the mesoporous structures to remove the volatilized organic compounds or degradation products. Any fluid which does not harm the mesoporous structures may be used for this purpose. Preferably the fluid is in the gaseous state. Among preferred fluids are air, nitrogen or inert gases. The flow rate is sufficient to remove the volatilized organic compounds or degradation products efficiently. Preferred flow rates are 5 $cm^3/g$ or greater, more preferably 25 $cm^3/g$ or greater and most preferably 50 $cm^3/g$ or greater. Preferred flow rates are 100 $cm^3/g$ or less, more preferably 75 $cm^3/g$ or less and most preferably 60 $cm^3/g$ or less. A vacuum may be applied to the mesoporous structures while being exposed to elevated temperatures to remove the volatilized organic compounds or degradation products. The mesoporous structures are removed from the environment in which the volatilization or burnout of organic compounds is performed.

The mesoporous structures may be used as recovered or can be further processed for the desired end use. The mesoporous structures can be formed into a desired shape with or without a binder. Alternatively the mesoporous structures can be further reacted with components to functionalize the mesoporous structures. Such processes are known in the art. In some embodiments the residual silanol groups are reacted with compounds to form covalent bonds to affix such compounds to the crosslinked silicon oxide structure. This functionalization allows the mesoporous structures to perform certain desired functions, see for instance Stucky US 2009/0047329. After the mesoporous structures are removed from the aqueous reaction medium, the reaction medium can be reused for the preparation of additional mesoporous structures. A portion of or all of the reaction medium may be reused in the first step of this process. When previously used aqueous reaction medium is used for the first step, all of the aqueous reaction medium may be reused or a portion of the reaction medium may be newly added, that is previously unused in this process. Preferably greater than 50 percent by weight of the aqueous reaction medium may be reused, more preferably greater than 75 percent by weight and most preferably greater than 90 percent by weight. In one embodiment a portion of the aqueous reaction medium has been previously used in the process and another portion of the aqueous reaction medium is make-up water, surfactant and/or micelle swelling agent. The use of make-up material (eg., water, surfactant and/or micelle swelling agent) prevents the aqueous reaction medium from degrading to a point at which the process cannot run efficiently. In this embodiment the amount of make up material is about 1.0 percent by weight or greater and most preferably 5.0 percent by weight or greater. In this embodiment the amount of make up material is about 90 percent by weight or less and most preferably about 75 percent by weight or less.

In the embodiment wherein organic compounds, are volatilized off from the reaction medium such materials can be collected as discussed hereinbefore. The volatilized materials may be recovered in a condenser. The collected organic materials can be recycled for use in the starting aqueous reaction medium. Preferably about 30 percent by weight or greater of the organic materials utilized in the aqueous reaction medium may be recycled, preferably about 75 percent by weight or greater and more preferably about than 90 percent by weight or greater. In the embodiment, wherein the organic materials are extracted from the mesoporous structures, the organic materials can be separated from the extraction solvent, the polar organic solvent or water, and recycled for use in the aqueous reaction medium. To recover the surfactant from the extraction solvent, the extraction solvent with the surfactant dispersed therein is exposed to evaporation conditions to volatilize the extraction solvent away leaving the surfactant which can be used in the aqueous reaction medium for preparing additional mesoporous structures. As a first stage the extraction solvent and surfactant may be subjected to rotary evaporation conditions to remove a portion of the extraction solvent. Thereafter the remaining extraction solvent can be removed by evaporation in a nitrogen box or by exposure to vacuum.

In some embodiments the recovered organic compounds may contain impurities that need to be removed before recycling. In some embodiments the impurities are unreacted silicon oxides or partially reacted silicon oxides. If these impurities are solid they can be removed by decantation, filtration (for instance by using membranes, filters or screens), centrifugation and the like. Where the impurities are ions (such as metal ions) the organic compounds can be passed through an ion exchange resin or membrane to remove the ions or by washing them with water to remove the ions. In some embodiments the impurities may be organic compounds which can be removed by contacting the mixture with solvents for the impurities or the organic compounds which do not dissolve the other component.

Illustrative Embodiments of the Invention

The following examples are provided to illustrate the invention, but are not intended to limit the scope thereof. All parts and percentages are by weight unless otherwise indicated.

Mesoporous Structure Preparation Process

A microemulsion sample is made by dissolving 2 g of surfactant TERGITOL™ 15S type surfactant in 60 ml of 1.6 M HCl at room temperature. To the microemulsion solution is slowly added an amount of 1,3,5-trimethylbenzene (TMB) to result in the desired micelle swelling agent/surfactant ratio, and the mixture is heated to 40° C. After 60 minutes, a silica source materials (i.e., freshly prepared silicic acid or Na silicate) is added. Silicic acid is prepared by dissolving 5 g of sodium silicate in 30 ml $H_2O$ and contacting it with an ion exchange resin, 25 ml of AMBERLITE™ resin (IR 120 hydrogen form. Sigma Aldrich), in particulate form, with stirring for 10 minutes in a beaker. After 20 to 24 hours at 40° C. a milky mixture is transferred to a sealed container and held at 100° C. for the next 24 hours. Solid product is filtered and washed with deionized (DI) water. After drying at room temperature for 24 hours the surfactant is removed by burnout at 500° C. for 8 hours in air flow, by solvent extraction or by a combination, thereof Several Examples and Comparative Examples are performed with mesoporous structures prepared using different surfactants, micelle swelling agent to surfactant ratios, and sources of silicon oxide. The mesoporous structures are examined for pore volume using nitrogen adsorption/desorption; and X ray diffraction for crystallinity. The results are compiled in Table 1.

TABLE 1

| Ex | Silicon Oxide Source | Surfactant Type | Micelle swelling agent/ Surfactant Ratio | Pore Volume, cm³/g | XRD pattern |
|---|---|---|---|---|---|
| 1 | polysilicic acid | 1 | 2 | 3.08 | Free of XRD pattern |
| 2 | polysilicic acid | 1 | 2.5 | 2.96 | Free of XRD pattern |
| 3 | polysilicic acid | 2 | 2 | 2.67 | XRD pattern |
| 4 | polysilicic acid | 3 | 2.5 | 2.65 | Free of XRD pattern |
| 5 | sodium silicate | 4 | 2 | 3.65 | Not measured |
| 6 | sodium silicate | 4 | 1.5 | 3.07 | Not measured |
| 7 | polysilicic acid | 4 | 1.5 | 2.47 | Not measured |
| 8 | polysilicic acid | 3 | 2 | 2.33 | Not measured |
| 9 | polysilicic acid | 4 | 2 | 2.33 | Not measured |
| 10 | polysilicic acid | 2 | 2.5 | 1.9 | Not measured |
| 11 | polysilicic acid | 1 | 3 | 1.87 | Not measured |
| 12 | polysilicic acid | 3 | 3 | 1.85 | |
| 13 | polysilicic acid | 4 | 2.5 | 1.84 | |
| 14 | polysilicic acid | 1 | 1.5 | 1.73 | |
| 15 | polysilicic acid | 2 | 1.5 | 1.66 | |
| 16 | sodium silicate | 1 | 2 | 1.49 | |

Surfactant 1 is TERGITOL™ 15 S-7 surfactant a secondary alcohol ethoxylate containing an average 7 moles of ED, available from The Dow Chemical Company Inc., Midland, Mich. Surfactant 2 is TERGITOL™ 15 S-9 surfactant a secondary alcohol ethoxylate containing an average 9 moles of EO, available from The Dow Chemical Company Inc., Midland, Mich. Surfactant 3 is TERGITOL™ 15 S-5 surfactant is a secondary alcohol ethoxylate containing an average 5 moles of EO, available from The Dow Chemical Company Inc., Midland, Mich. Surfactant 4 is P123 surfactant which is $EO_{20}$-$PO_{20}$-$EO_{20}$ and available from BASF.

Figure 1:
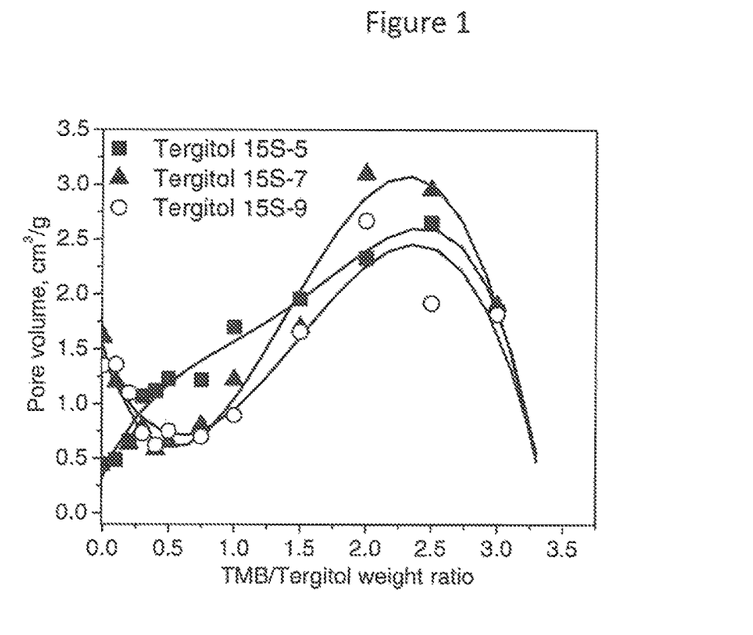
FIG. 1 is a graph showing plots of the weight ratio of micelle swelling agent/surfactant against the resulting particle pore volume for mesoporous silicon oxide based structures prepared using three different TERGITOL™ surfactants.

The pore volume as function of the micelle swelling agent (1,3,5-trimethylbenzene) to surfactant ratio for Surfactants 1, 2 and 3 (as described above) are plotted in FIG. 1. This data demonstrates that the use of silicic acid as a silicon oxide source and surfactants of type 1, 2 and 3 give high porosity materials, the micelle swelling agent to surfactant ratio between 1.5 and 2.5, and surfactants 1 and 2 form mesoporous structures with the highest pore volumes.

Comparison of Mesoporous Structures of the Invention to Mesoporous Structures Prepared According to Pinnavia Process (MSU Structures)

Figure 2:
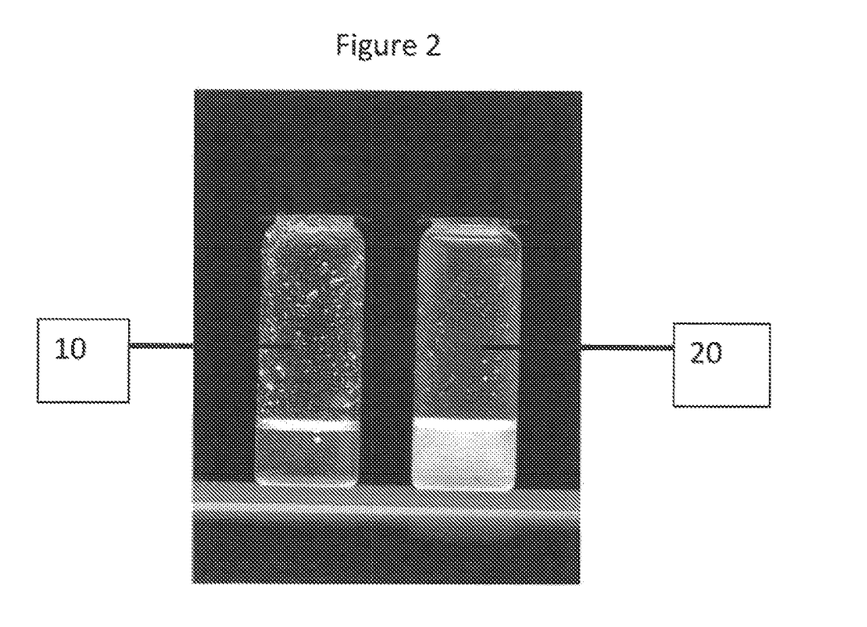
FIG. 2 is a picture of two mesoporous structures in carbon tetrachloride.

Into two vials 0.0667 g of mesoporous silica structures according to the invention and available from InPore, which are believed to be prepared according to the Pinnavia process (MSU) structures are weighed. 1.00 ml of Carbon tetrachloride, dried over molecular sieves, is added to each silica sample. The carbon tetrachloride is allowed to diffuse into the cavities of the mesoporous silica structures. The Pinnavia structures exhibit transparency within 5 minutes. The mesoporous structures of the invention remain opaque. Carbon tetrachloride, has an index of refraction which matches silica, as carbon tetrachloride enters the cavities and porous channels of the mesoporous silica structures, displacing the air, the silica scattering by light disappears and the gel becomes transparent. FIG. 2 shows the Pinnavia mesoporous silica structures in carbon tetrachloride 10 and the mesoporous silica structures of the invention in carbon tetrachloride 20.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A process comprising

A) contacting one or more of silicic acid and polysilicic acids with an aqueous reaction medium comprising one or more nonionic surfactants thereby forming an aqueous reaction medium comprising micelles wherein the aqueous reaction medium further comprises one or more micelle swelling agents capable of swelling the micelles at a temperature of 20° C. o 60° C. for 2 to 120 hours wherein the one or more nonionic surfactants are present in the aqueous medium in an amount of from 1 to 5 percent by weight and weight ratio of the one or more of silicic acid and polysilicic acids to the one or more nonionic surfactants is from 1:6 to 2:1 and the weight ratio of the micelle swelling agent to the one or more nonionic surfactants is 1:4 to 8:1 to form mesoporous structures comprising crosslinked silicon oxide units, wherein said crosslinked silicon oxide units define pores of 5 to about 100 nanometers and wherein the aqueous reaction medium exhibits a pH of about 0 to about 4.0;

B) exposing the aqueous reaction medium containing the mesoporous structures to elevated temperatures of 80° C. to 180° C. for a time sufficient to achieve a desired structure and pore size of 1 to 80 hours, the desired structure comprises the mesoporous structures comprising the crosslinked silicon oxide units forming a crosslinked silicon oxide network: wherein the process does not include a calcination step and the mesoporous structures exhibit a pore volume of about 1.5 cm$^3$/g or greater and are amorphous, the connectivity of the crosslinked silicon oxide network is 2.5 or less wherein connectivity is defined by $Q^4/(Q^2+Q^3)$ wherein $Q^4$ is the number of silicon oxide units having four bonds to other silicon oxide units, $Q^3$ is number of silicon oxide units having three bonds to other silicon oxide units and $Q^2$ is number of silicon oxide units having two bonds to other silicon oxide units, and the crosslinked silicon oxide units contain silanol groups in a concentration of about 6.0 weight percent or greater.

2. A process according to claim 1 wherein the mesoporous structures are separated from the aqueous reaction medium.

3. A process according to claim 1 wherein the weight ratio of the micelle swelling agent to the one or more nonionic surfactants is about 2:1 to about 3:1.

4. A process according to claim 1 wherein the micelle swelling agent exhibits a boiling point below the temperature utilized in Step B.

5. A process according to claim 1, wherein the weight ratio of the micelle swelling agent to the one or more nonionic surfactants is about 1:1 to about 3:1.

6. A process according to claim 1, wherein the surfactant is an alkoxylated alcohol.

7. A process according to claim 1, wherein the mesoporous structures formed contain 10 percent by weight or less of organic materials and contain 0.5 percent or less by weight of metal, metal oxide or metal ions.

* * * * *

UNITED STATES PATENT AND TRADEMARK OFFICE
CERTIFICATE OF CORRECTION

PATENT NO. : 9,890,047 B2
APPLICATION NO. : 14/352423
DATED : February 13, 2018
INVENTOR(S) : Kilos et al.

It is certified that error appears in the above-identified patent and that said Letters Patent is hereby corrected as shown below:

In the Claims

In Claim 1, Column 16, Line 60, after C. (first occurrence) delete "o" and insert --to--.

Signed and Sealed this
Thirty-first Day of July, 2018

Andrei Iancu
*Director of the United States Patent and Trademark Office*